S. W. BABBITT.
Toilet Caster.

No. 162,006. Patented April 13, 1875.

Witnesses.
J. H. Shumway
C. V. Forbes

S. William Babbitt,
Inventor
By Atty.
John O. Earl

UNITED STATES PATENT OFFICE.

S. WILLIAM BABBITT, OF WEST MERIDEN, CONNECTICUT, ASSIGNOR TO WILCOX SILVER-PLATE COMPANY, OF SAME PLACE.

IMPROVEMENT IN TOILET-CASTERS.

Specification forming part of Letters Patent No. 162,006, dated April 13, 1875; application filed December 16, 1874.

*To all whom it may concern:*

Be it known that I, S. WILLIAM BABBITT, of West Meriden, in the county of New Haven and State of Connecticut, have invented a new Toilet-Caster; and I do hereby declare the following, when taken in connection with the accompanying drawings and the letters of reference marked thereon, to be a full, clear, and exact description of the same, and which said drawings constitute part of this specification, and represent, in—

Figure 1:
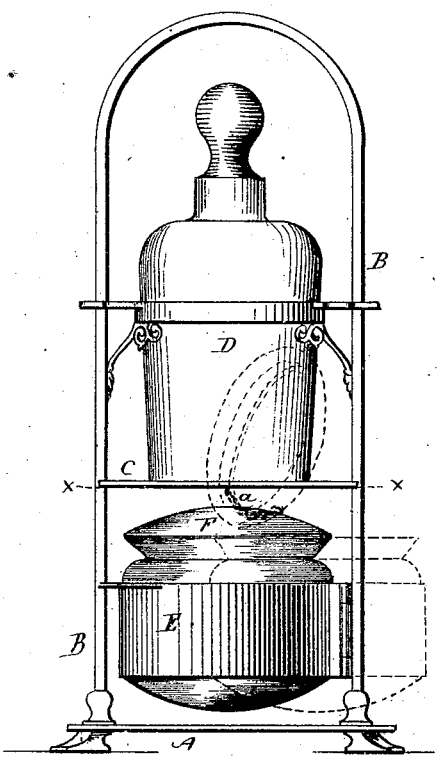
Figure 2:
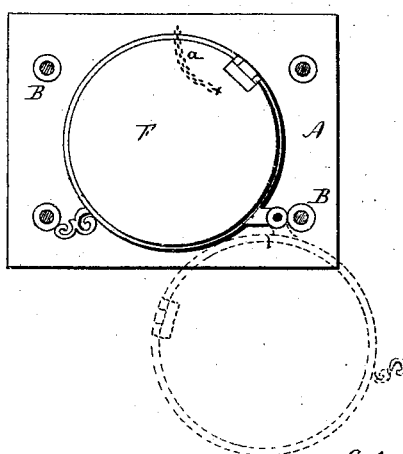

Figure 1, front view; Fig. 2, a sectional plan view, cutting through x x.

This invention relates to an improvement in the manner of combining pots with caster-frames, having special reference to toilet-casters, but applicable to other caster-frames, such as wine-casters, table-casters, &c.; and the invention consists in hinging the pot to the frame upon a vertical pintle, so as to swing from the frame in a horizontal plane when it is desired to reach the contents in the pot, and connecting the cover to the frame so that in swinging out the pot the cover will be automatically opened, and be closed when the pot is returned, as more fully hereinafter described.

A is the base of the caster-frame; B B, the uprights; C, the platform on which the bottles rest, here represented by a single bottle, D. Beneath the platform C the pot E is arranged, and is hinged to one of the uprights, or to other convenient part, so as to be swung out from beneath the platform C, as denoted in broken lines. The pot is provided with a hinged cover, F, the hinge arranged upon or near the rear side, and to the cover a connection, a, is made, by a chain or otherwise, to some part of the frame, so that in swinging out the pot the connection a will hold upon the cover and cause it to open, as denoted in broken lines; then, when the pot is returned, the cover will close by its own gravity. Such a construction and arrangement of a pot is applicable to toilet-casters, as a powder-box; to wine-casters, for sugar; to table-casters, for mustard and like condiments; to pitcher-casters, as a slop-receiver.

I therefore do not confine myself to any particular form of caster-frame, it only being essential that the bottle-holder be above the pot. By the term bottle I embrace any article usually supported in a caster-frame, substantially such as before mentioned.

I claim—

The combination, in a caster, of the base which supports the bottle or bottles, the pot E, hinged to the frame below the said base, the cover F, hinged to the pot, and connected to the frame, substantially as described, so that turning the said pot from beneath the base will cause the opening of the cover, and returning the pot will close the cover.

S. WM. BABBITT.

Witnesses:
 JOHN H. BARIO,
 ADDIE C. S. BARIO.